United States Patent [19]

Wirth et al.

[11] 3,836,433

[45] Sept. 17, 1974

[54] FIXATION OF NITROGENOUS MATERIALS

[75] Inventors: Pierre-Charles Wirth; Réne Tixier, both of Paris, France

[73] Assignee: Societe Generale De Recherches Et D'Applications, Scientifiques Sogeras, Paris, France

[22] Filed: Apr. 13, 1972

[21] Appl. No.: 243,875

[30] Foreign Application Priority Data

Apr. 16, 1971 Great Britain...................... 9669/71

[52] U.S. Cl.............. 195/68, 195/63, 195/DIG. 11, 260/8, 260/212, 260/233.3
[51] Int. Cl.......................... C07g 7/02, C08b 15/06
[58] Field of Search................. 195/68, 63, DIG. 11; 260/8, 212, 233.3

[56] References Cited

UNITED STATES PATENTS

| 3,553,310 | 1/1971 | Csizmas et al. | 424/2 |
| 3,645,852 | 2/1972 | Axen et al. | 195/68 |
| 3,705,084 | 12/1972 | Reynolds | 195/63 |
| 3,767,531 | 10/1973 | Olson et al. | 195/63 |
| 3,770,700 | 11/1973 | Forgione | 195/63 X |

*Primary Examiner*—Lionel M. Shapiro
*Attorney, Agent, or Firm*—Waters, Roditi, Schwartz & Nissen

[57] ABSTRACT

Dialdehydes, e.g., glyoxal or glutaraldehyde are used to fix nitrogenous materials, e.g., amino acids, proteins, enzymes, antigens, hormones, etc., to insoluble supports which form gels in aqueous media, e.g., polyacrylamide or polysaccharides such as agar-agar.

10 Claims, No Drawings

FIXATION OF NITROGENOUS MATERIALS

This invention is concerned with improvements in and relating to the fixing of natural or synthetic nitrogenous materials on an insoluble support.

Broadly, the present invention comprises fixing a natural or synthetic nitrogeneous substance to an insoluble support by means of a dialdehyde as bridging compound.

The support materials used in accordance with the invention may be granular in form or may take the form of spherical pearls or beads which may have varying dimensions. The support material may be any natural or synthetic polymer capable of forming a gel in aqueous media. Examples of such polymers are polysaccharides, for example agar-agar or agarose, or polyacrylamide. These polymers may be used alone or in admixture, for example a mixture of agarose and polyacrylamide. Examples of nitrogenous substances which may be fixed to the insoluble support in accordance with the invention are natural compounds such as amino acids, polypeptides, proteins and other biochemical compounds containing a proteinic portion in the molecule or, more simply, an amino or amido group. Natural products which may be fixed in accordance with the invention include enzymes, enzyme inhibitors, antibodies, antigens, polypeptide hormones, proteinic hormones and certain proteins such as the concanavalines. Synthetic nitrogenous compounds which may be fixed in accordance with the invention include enzyme inhibitors.

In accordance with the present invention, the nitrogenous compound is fixed to the insoluble support by means of a difunctional organic compound which forms a bridge between the nitrogenous compound and the support. These bridge compounds are dialdehydes in which the aldehyde groups are situated at the ends of an aliphatic or aromatic chain. The dialdehydes which are used as bridge compounds in accordance with the invention, may be represented by the formula:

$$OHC - R - CHO$$

in which R is an aliphatic or aromatic chain of variable length and composition. Generally R will be a polymethylene chain of the formula $-(CH_2)_n-$ in which $n$ is from 0 to 6. In practice, the most convenient dialdehydes are glutaraldehyde and glyoxal. The dialdehyde compound reacts partly with the hydrophilic groups on the support gel (for example hydroxyl groups in the case of agarose or amide groups in the case of polyacrylamide) and partly with the amine function of the nitrogenous substance, such as a protein, which it is desired to fix to the support.

The fixing or coupling of the nitrogenous substance to the support gel in accordance with the invention is carried out in two stages. In the first stage, a known quantity of the gel which may be hydrated or may be dry (a rehydratable lyophilized gel is brought into contact with an excess of the dialdehyde (for example glutaraldehyde) in aqueous solution or in a suitable solvent medium except tris(hydroxymethyl)aminomethane which may react with the dialdehyde. The activated gel is then washed to remove excess aldehyde. In the second stage the nitrogenous substance is combined with the free aldehyde groups on the activated gel. The combination of nitrogenous substance and support is then washed to remove excess, non-fixed nitrogenous material. Absorbtion due to electrostatic forces which may occur in the case, for example, of cellulose, does not occur with agarose or acrylamide gels. It is noteworthy that this combination is such that the gel may be lyophilized and stored in the dry rehydratable form.

The process in accordance with the invention is particularly suitable for use with enzymes. One of the major problems of the preparation of insoluble enzyme compositions is their loss of activity as a result of the chemical reactions used to fix or insolubilize them, the activity of the fixed enzyme being, in general, very much lower than that of the soluble enzyme. It has been found that, in accordance with the present invention, not only is all the activity of the enzyme preserved but that in the majority of cases, the activity is increased, in particular when the enzymes are fixed to acrylamide-agarose gels, as shown in Table 1 below.

TABLE I

| Enzyme | Composition of gel | | % enzyme fixed on dehydrated gel | % activity of enzyme fixed as compound with that of soluble enzyme |
|---|---|---|---|---|
| | % acrylamide | % agarose | | |
| Trypsine | 4 | 2 | 4.6 | 116 |
| | 4 | 3 | 5.0 | 114 |
| | 6 | 4 | 6.5 | 156 |
| Chymotrypsine | 4 | 2 | 4.6 | 110 |
| | 4 | 4 | 6.5 | 140 |
| | 6 | 2 | 6.8 | 100 |
| Pancreatic proteases | 4 | 4 | 3.0 | 120 |
| Papaya juice protease | 4 | 2 | 3.2 | 120 |
| | 4 | 4 | 3.5 | 130 |
| Alpha-amylase | 3 | 4 | 2.5 | 80 |
| Urease | 3 | 2 | 4.2 | 100 |
| Agrinase | 4 | 2 | 4.1 | 100 |
| Lysozyme | 5 | 1 | 2.5 | |
| Cytochrome | 4 | 4 | 6.0 | |

Note: For the proteases measurement was made on a hemoglobin. Better results were often observed on synthetic substrates.

In the case of amylase, for example, the activity found, whilst less than 100 percent, is remarkable since the substrate, (soluble amidon) having a high molecular weight, the contact with the enzyme molecules fixed to the interior of the beads is considerably reduced.

It has also been found that insoluble enzymes produced in accordance with the invention are more stable than the corresponding soluble enzymes. Thus their stability with regard to time and their resistance to thermal denaturation are better than those of the soluble enzymes.

Since enzymes may be fixed to regular beads of the support, in accordance with the invention, it is possible to prepare columns containing the beads so that an enzymatic reaction may be carried out by passing a suitable reaction medium through the column of the gel. Since enzymes have a selective affinity for certain natural substances, particularly their inhibitors, the fixed enzyme compositions of the invention may be used to extract these substances from solutions thereof. Thus, the insoluble proteolytic enzymes of the invention combine under certain pH conditions with their inhibitors which may then be eluted with eluant solutions of different pH. On the other hand, the user of natural or synthetic enzymes inhibitors fixed to a gel in accordance with the invention, makes it possible to selectively separate the corresponding enzymes from solutions thereof. In a similar manner if certain selective substrates are fixed on the gel these may be used for selective absorbtion of enzymes which react or combine with the substrates. Such selective separation of enzymes on an insoluble gel having a fixed substance having an affinity with the enzymes is preferably carried out by passage of an extraction solution containing the enzymes over a column of the gel which is preferably in the form of regular pearls or beads to permit a regular and sufficiently rapid passage of the solution through the column. When the enzyme has been fixed to the active material supported on the gel, the column is washed and then the enzyme is eluted with an eluant solution of an appropriate pH. It is also possible to absorb or extract the enzyme by dispersing beads of the gel containing the fixed material in the medium containing the enzyme and subsequently separating these beads from the solution, for example by centrifuging and subsequently washing these and eluting out the enzyme. A similar procedure may be used by fixing an antibody or antigen to a gel. Thus, insoluble antigens produced in accordance with the invention make it possible to selectively isolate the corresponding antibodies, for example seric antibodies, from a solution and, on the other hand, insoluble antigens fixed in accordance with the invention selectively absorb corresponding antibodies such as, for example, insulin.

Insoluble proteins fixed in accordance with the invention and which possess an affinity to certain biological constituents may also be used in a similar manner as described above. Thus, for example, the concanavalines, which are vegetable proteins, possess a particular affinity for polysaccharides and glucoproteins. Thus by fixing a concanavaline on a gel in accordance with the invention, it is possible to separate a polysaccharide or glucoprotein from a solution or medium containing it. This not only makes it possible to selectively isolate the polysaccharides which form a part of cell walls but also to separate cells the walls of which contain the particular polysaccharides or glucoproteins for which the concanavaline has an affinity.

It will be readily appreciated that the fixed nitrogeneous substances produced in accordance with the invention may find a very wide variety of applications and that the above description does not cover the whole range of use therefor. For a better understanding of the invention, the following Examples are given by way of illustration only.

EXAMPLE 1

Fixation of amino acids on acrylamide/agarose beads using glutaraldehyde

100 Grams of a lyophilized acrylamide/agarose gel (having the composition given in Table 1) are suspended in 2.5 liters of a 10 percent aqueous solution of glutaraldehyde. The mixture is then stirred for 4 to 5 hours at a temperature of from 10° to 25°C.

The activated gel is then washed by resuspending it in demineralized water, followed by filtration centrifuging until non-combined glutaraldehyde has been completely removed as evidenced by spectraphotometry at 280 millimicrons.

15 Grams of the desired amino acid are dissolved in 1 liter of a 0.1 molar solution of sodium bicarbonate (pH 7.5) and the filtered or centrifuged active gel is suspended therein. The whole mixture is mechanically stirred for about 60 minutes to allow fixation of the amino acid on the support. The gel is then recovered by filtration under vacuum and washed several times firstly with sodium bicarbonate solution and then with demineralized water to remove any non-fixed amino acid. The gel is filtered off and may be stored either in the hydrated state at ambient temperature in the presence of a bacteriostat (0.02 percent of sodium nitride) or at 4°C; or may be lyophilized and stored at ambient temperature. The following Table 2 gives the results for a number of amino acids, namely a neutral amino acid (L- and D-tryptophane), acid amino acids (d,1-aspartic acid), basic amino acids (1-arginine) and Sulfur-containing amino acids (1-cysteine).

Table 2

| Amino Acid | Composition of the gel % acrylamide | % agarose | % amino acid fixed on dehydrated gel |
| --- | --- | --- | --- |
| l-tryptophane | 8 | 2 | 11.9 |
| d-tryptophane | 8 | 2 | 12.3 |
| l-tryptophane | 6 | 4 | 4.5 |
| l-trytophane | 4 | 3 | 3.2 |
| l-cysteine | 6 | 4 | 4.6 |
| l-cysteine | 4 | 3 | 6.5 |
| l-arginine | 8 | 2 | 3.2 |
| d,l-aspartic acid | 6 | 4 | 4.0 |
| d,l-aspartic acid | 6 | 2 | 8.0 |

In the case of cysteine the free SH group content of the fixed cysteine was found to be 55 percent as determined by the 5,5'-dithio-bis(2-nitrobenzoic acid) method (ELLMAN, archiv. biochem. 82,70, 1959).

EXAMPLE 2

Fixation of seric proteins used in glutaraldehyde.

10 Grams of dehydrated acrylamide/agarose gel are suspended in 250 ml of a 10 percent aqueous solution of glutaraldehyde at ambient temperature. The suspension is then stirred for 5 hours. The beads on the gel are then washed several times wih demineralized water in order to remove excess, non-combined glutaraldehyde.

Filtered gel is then introduced into a solution of 1 gram of the seric protein in 100 ml of 0.15 molar aqueous sodium chloride. The resultant mixture is mechanically stirred for about an hour to fix the prtein. The gel is then washed several times with the sodium chloride solution to remove excess, non-fixed protein and is then filtered off. The insoluble composition, after the final washing with water to remove the sodium chloride, is filtered off and then stored in the dehydrated form after lyophilization.

The above procedure was carried out using gamma globulin on an acrylamide/agarose gel containing 4 percent of acrylamide and 3 percent of agarose to give a fixed protein compositon containing 3.8 percent of fixed protein. In a second test a serum albumin was fixed on an acrylamide/agarose gel containing 4 percent acrylamide and 2 percent agarose to give a fixed protein composition containing 3.3 percent of fixed protein. In a third test albumin was fixed onto an acrylamide/agarose gel containing 6 percent acrylamide and 4 percent agarose to produce a product containing 8 percent of the fixed protein.

EXAMPLE 3

Fixation of a vegetable protein using glutaraldehyde

This example illustrates the fixing of concanavaline onto an acrylamide/agarose gel containing 4 percent acrylamide and 2 percent agarose.

1 gram of the lyophilized gel suspended in 20 ml of a 10 percent aqueous solution of glutaraldehyde and stirred at room temperature for 3 hours. After washing with demineralized water to remove the excess of glutaraldehyde and filtering off the gel this is introduced into a concanavaline solution containing 50 ml of the protein in a mixture of 4 ml of molar sodium chloride solution and 6 ml of 0.07 molar sodium bicarbonate solution.

The whole mixture is then stirred at 4°C for 2 hours, the gel is recovered and then washed several times to remove non-fixed concanvaline as determined by the spectrophotomery at 280 millimicrons. After final filtration the gel/concavaline composition is recovered and may be stored either in suspension in 80 ml of molar sodium chloride solution at 4°C, or, after lyophilization, at ambient temperature. The dehydrated gel contains 3.5 percent of fixed concanavaline.

EXAMPLE 4

This example illustrates the fixing of insulin on acrylamide/agarose beads containing 4 percent acrylamide and 3 percent of agarose.

1 Gram of acrylamide/agarose gel activated as described in Example 3 is added to a solution of 80 mg of insulin in 10 ml of 0.15 molar sodium chloride and the whole is stirred for 3 hours at 5°C.

The gel/insulin composition is filtered off, washed several times with the sodium chloride solution until the excess insulin is removed and then, after a final filtration, recovered and stored at 4°C. The dehydrated beads contain 2.2 percent of fixed insulin.

EXAMPLE 5

Fixation of enzymatic active proteins using a glyoxal

10 Grams of a lyophilized acrylamide/agarose gel (4 percent acrylamide, 2 percent agarose), are suspended in 350 ml of a 40 percent solution of glyoxal and mechanically stirred for 5 to 6 hours at ambient temperature. The gel dehydrates slowly and, at the same time, reacts with the glyoxal.

The gel is then recovered from the suspension and washed to remove all excess, uncombined glyoxal as determined by spectrophotometry at 260 millimicrons.

The washed and filtered gel is then suspended in 170 ml of a 1 percent solution of the enzyme in a 0.02 molar solution of calcium chloride (pH 7.8) and mechanically stirred for 2 hours at 4°C. The insoluble complex is recovered, washed with water to remove excess, unfixed enzyme and stored after a final filtration, in the hydrated state at 4°C or is lyophilized.

When using trypsine as enzyme 5.5 percent of enzyme was fixed to the gel and when using chymotrypsine as enzyme 5.8 percent of the enzyme was fixed to the gel.

EXAMPLE 6

Fixation of an enzyme active protein on an acrylamide gel using glutaraldehyde

4 Grams of a dehydrated 12 percent acrylamide gel is suspended in 100 ml of a 10 percent solution of glutaraldehyde in 0.02 molar sodium chloride at pH 7.5. The mixture is stirred for 2 hours at 50°C and the gel is then centrifuged off, washed several times with a 0.02 molar calcium chloride solution until non-combined, excess glutaraldehyde is removed as determined by a negative reaction with fuchsine or as identified by optical density at 280 millimicrons.

The centrifuged gel is then added to a solution of 1.20 grams of the enzyme in 100 ml of a 0.02 molar solution of calcium chloride (pH 7.8). The whole mixture is stirred at 4°C for 60 to 90 minutes. The gel is centrifuged off and washed with a 0.2 molar calcium chloride solution to remove non-fixed enzyme. The gel is then recovered by centrifuging and lyophilized. In a test using trypsine as enzyme, the dehydrated product contained 0.260 grams of enzyme per gram of gel.

EXAMPLE 7

Fixation of enzymatic active protein on a hydrated gel using glutaraldehyde 10 ml of a 25 percent aqueous solution of glutaraldehyde are added to 20 ml of hydrated gel as measured in a graduated cylinder after sedimentation. The mixture is stirred in the cold for 5 hours and then the activated gel is recovered and washed several times with demineralized water to remove excess, non-combined glutaraldehyde.

The washed filtered gel is then added to a 1 percent solution of trypsine in a 0.02 molar calcium chloride solution (pH 7.8). The mixture is stirred for 60 minutes at 4°C and then the gel/trypsine composition is recovered by filtration or centrifuging. The gel is then washed several times with 30 ml lots of 0.02 molar calcium chloride solution, again recovered and then stored either in the hydrated or in the lyophilized state.

In two tests following the above procedure, when using agarose beads (4 percent agarose) as support, the resultant product contained 7 percent of fixed enzyme and when using an acrylamide/agarose gel (4 percent acrylamide, 2 percent agarose), the product contained 4.9 percent fixed enzyme, based on the dehydrated product.

EXAMPLE 8

Fixation of various enzymes and co-enzymes on acrylamide/agarose gels using glutaraldehyde 1 Gram of the gel (having the composition given in Table 2 below is suspended in 10 percent glutaraldehyde solution in 0.02 molar aqueous calcium chloride solution (pH 7-8). The mixture is stirred for 4 to 5 hours at a temperature of 10° to 25°C. After recovering the gel from the stirred mixture, it is washed with the calcium chloride solution to completely remove free glutaraldehyde.

The washed gel is then added to a solution of 100–125 milligrams of the enzyme in 10 ml of 0.02 molar calcium chloride solution (pH 7-8) cooled to 4°C. The mixture is stirred for 60 to 90 minutes at a temperature of 4°C.

The enzyme having been fixed to the support gel, this latter is recovered and then washed with the calcium chloride solution to remove excess enzyme. After a final filtration the gel is recovered and lyophilized.

The results of those tests are shown in Table 2.

EXAMPLE 9

Fixation of synthetic nitrogenous material on an acrylamide/agarose gel

In this Example the ethyl ester of benzoylarginine is fixed on an acrylamide/agarose gel containing 4 percent acrylamide and 3 percent agarose.

10 Grams of the dehydrated gel are suspended in 25 ml of a 10 percent aqueous solution of glutaraldehyde and stirred for 4 hours at ambient temperature. The gel is then recovered, washed and filtered.

The filtered gel is then added to a solution of 1.5 grams of benzoylarginine ethyl ester in 100 ml of demineralized water. The mixture is stirred at 5°C for 60 minutes and the gel then recovered, washed several times and finally lyophilized. The dehydrated gel contains 1.2 percent of benzoylarginine ethyl ester.

What we claim is:

1. A process for binding a nitrogenous substance to an insoluble support which comprises first contacting a dialdehyde with the support, whereby one aldehyde group chemically combines with the support, removing the excess dialdehyde and then contacting the chemically modified support with a nitrogenous substance, whereby the second aldehyde group, chemically combines with the nitrogenous substance, said support comprising spherical beads of a polysaccharide gel or an acrylamide gel or a polysaccharide/acrylamide gel.

2. A process as claimed in claim 1 in which the polysaccharide is agar or agarose.

3. A process as claimed in claim 1 in which the nitrogenous substance is a natural compound.

4. A process as claimed in claim 3 in which the nitrogenous substance is a natural compound, such as an amino acid, a polypeptide or a compound containing a proteic moiety or an amino or amido function such as an enzyme, enzyme inhibitor, anti-body, anti-gen, polypeptide hormone, proteic hormone or a protein such as a concanavaline.

5. A process as claimed in claim 1 in which the dialdehyde is of the formula:

$$OHC-R-CHO$$

in which R is an aliphatic or aromatic chain.

6. A process as claimed in claim 5 in which R is a polymethylene chain of the formula $-(CH_2)_n$ in which $n$ is from 0 to 6.

7. A process as claimed in claim 5 in which the dialdehyde is glutaraldehyde or glyoxal.

8. A process as claimed in claim 1 which comprises, in the first stage, reacting beads of the gel with an excess of a dialdehyde compound in aqueous solution, and, in a second stage, reacting the nitrogenous substance with the free aldehyde groups attached to the support.

9. A process as claimed in claim 2 wherein the support is an agarose-acrylamide gel and the nitrogenous substance in an enzyme.

10. A process as claimed in claim 9 in which the enzyme is trypsine, chymotrypsine, a pancreatic protease, a papaya juice protease, alpha-amylase, Urease, arginase, lysozyme or cytochrome.

* * * * *